Nov. 11, 1969     A. R. KAUFMANN     3,477,114

METHOD AND APPARATUS FOR EDGE-BONDING METALLIC SHEETS

Filed May 15, 1967     3 Sheets-Sheet 1

INVENTOR.
ALBERT R. KAUFMANN
BY
ATTORNEYS

INVENTOR.
ALBERT R. KAUFMANN

ATTORNEYS

United States Patent Office 3,477,114
Patented Nov. 11, 1969

3,477,114
METHOD AND APPARATUS FOR EDGE-BONDING METALLIC SHEETS
Albert R. Kaufmann, Lexington, Mass., assignor to Whittaker Corporation, Los Angeles, Calif., a corporation of California
Filed May 15, 1967, Ser. No. 638,286
Int. Cl. B23k *21/00; 31/00*
U.S. Cl. 29—470.1                9 Claims

ABSTRACT OF THE DISCLOSURE

A method and apparatus for edge-bonding metallic sheets of the same or different thicknesses are described. The metallic sheets are overlapped and fed to a pair of specially prepared rollers which simultaneously shear off a segment of one of the sheets and force the sheets together along the edges to create a strong metallurgical bond between the sheets. The shearing and bonding action are assisted by the placement of circumferentially extending grooves in at least one of the rollers which receive the sheared segment.

BACKGROUND OF THE INVENTION

Metallic sheets of two or more metals which are pressure-bonded to each other on adjacent plane surfaces are known in the art. Composite sheets of this type are formed by placing the individual sheets to be joined on top of one another in the form of a "sandwich" and subsequently pressing the adjacent sheets together and elongating them by means of forces exerted at right angles to the common plane of the sheets. This is generally done in rolling mills although other methods may be used. Such methods are adequate where the sheets are to be joined over extended plane surfaces, but are wholly inadequate where the sheets are to be joined along a common edge in a single plane.

Present methods of producing composite sheets which are edge-bonded to each other commonly utilize relatively slow and expensive welding processes which are unduly time consuming and therefore costly. Further, the weld zone joining the sheets of dissimilar metal is frequently too wide and erratic and is unsuitable for many applications requiring a more precise control of the location and dimensions of the weld zone. These factors have heretofore limited the usefulness of such methods in producing edge-bonded composite metallic sheets. A method of edge-bonding which utilizes a rolling mill having planetary gears has been proposed, but such a method relies on auxiliary heating apparatus to assist in forming the desired edge-bond.

SUMMARY OF THE INVENTION

In accordance with my invention, edge-bonded composite metallic sheets are formed by overlapping sheets of the same or different stiffness in the vicinity of the edge to be bonded and subsequently applying a force transversely to the sheets; this force simultaneously shears at least one of the sheets and creates an edge bond between them.

Accordingly, it is an object of my invention to provide an improved method of edge-bonding metallic sheets. Further, it is an object of my invention to provide an improved method of edge-bonding metallic sheets by a combined shearing and bonding operation.

The combined shearing and bonding may advantageously be accomplished by feeding the overlapped sheets to a pair of specially prepared rollers, at least one of which has a shallow groove extending circumferentially around its surface for seceiving the sheared segment of the overlapped sheets. By providing additional grooves on one or more of these rollers, metallic sheets of different thicknesses can be accommodated and edge-bonded to each other to form a wide variety of composite metallic products.

Accordingly, a further object of my invention is to provide apparatus for simultaneously shearing and edge-bonding metallic sheets of the same or different thickness.

SPECIFICATION

The above and other and further objects and features of my invention will be more readily understood by reference to the following detailed description of the drawings in which.

Figure 2:
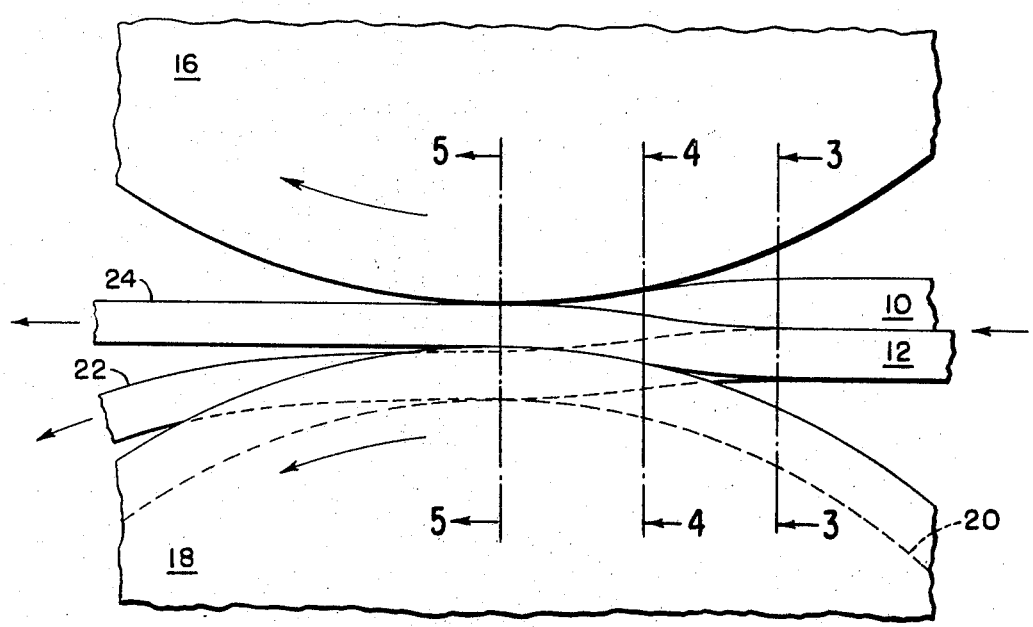
FIG. 2 is a side sectional view of a portion of the rollers of FIG. 1 in the region of contact between the rollers and the metallic sheets.
Figure 5:
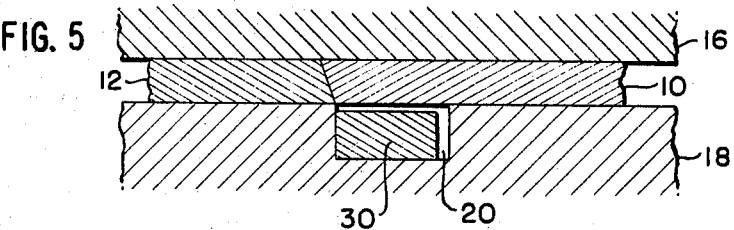
Figure 6:
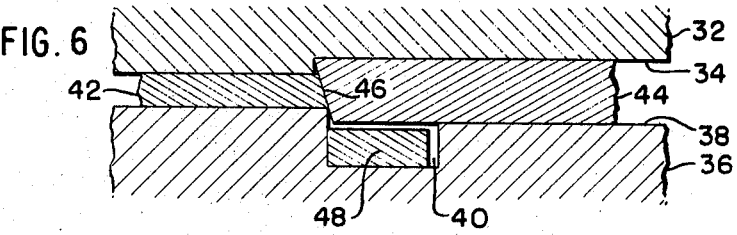
Figure 7:
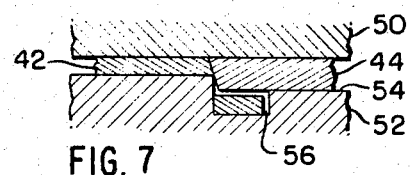
Figure 8:
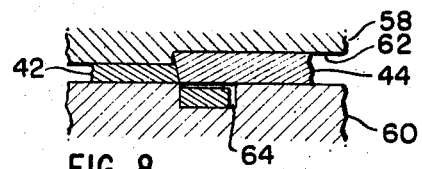

FIG. 5 is a transverse sectional view along the lines 5—5 of FIG. 2 showing the positioning of the sheets after the shearing action has been completed; and FIGS. 6, 7 and 8 are transverse sectional views of three related alternative embodiments of my invention illustrating apparatus for bonding sheets of different thickness, the sections in these figures corresponding to the section shown in FIG. 5.

Figure 3:
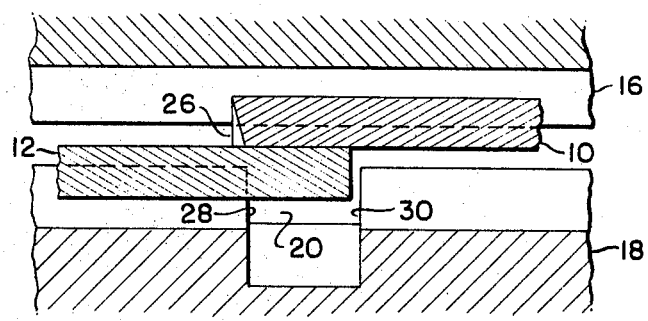
FIG. 3 is a transverse sectional view along the lines 3—3 of FIG. 2 showing the positioning of the metallic sheets prior to contact with the rollers.
Figure 9:
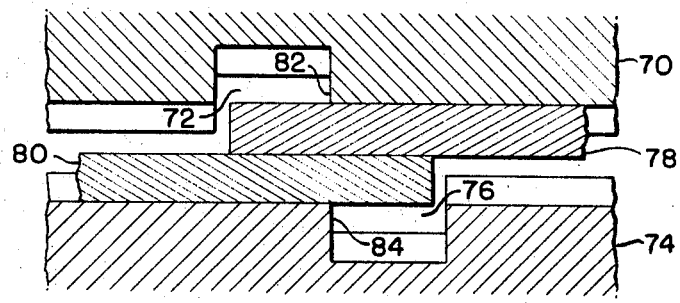
Figure 10:
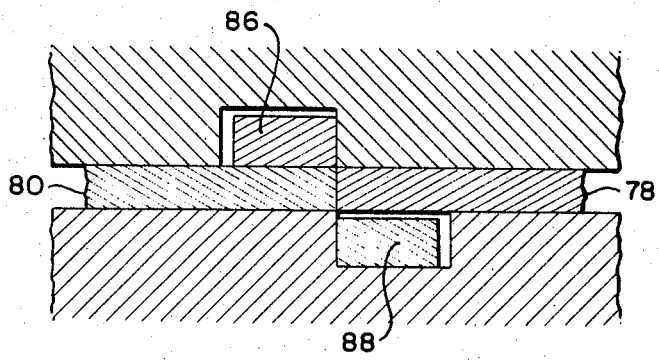
Figure 11:
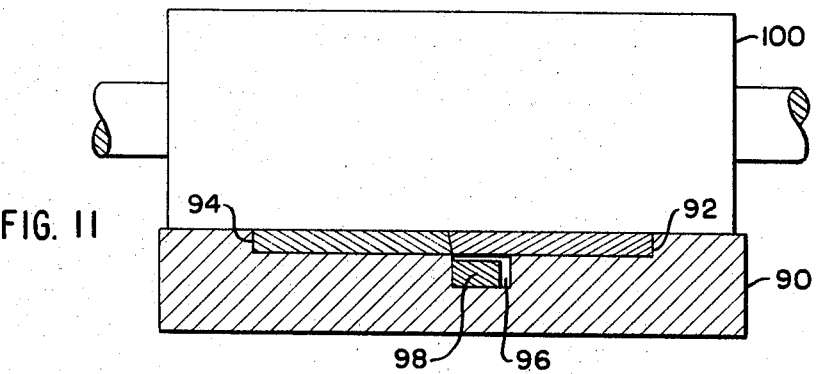

FIGS. 9 and 10 are transverse sectional views of yet another embodiment of my invention, the views in these figures corresponding to those shown in FIGS. 3 and 5 respectively; and FIG. 11 is a transverse sectional view of still another embodiment of my invention in which the lower roll has been replaced by a specially prepared plane surface holding the sheets to be edge-bonded.

Figure 1:
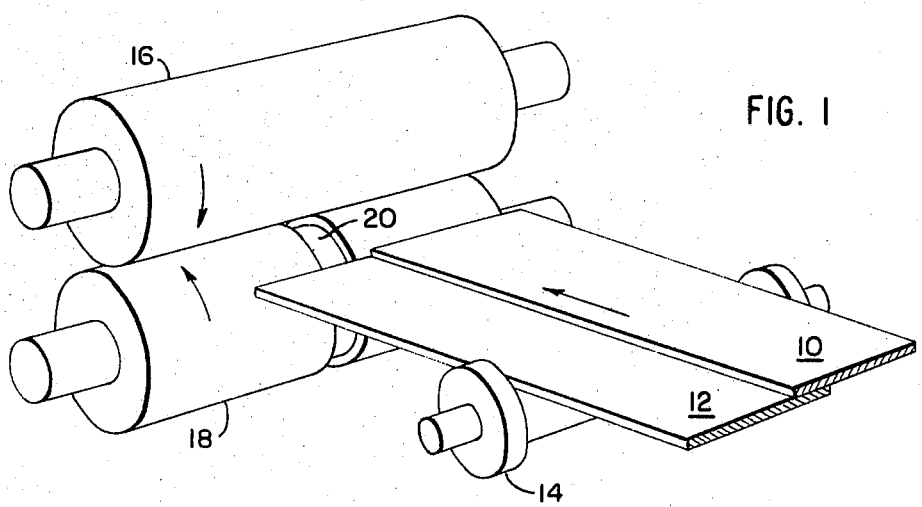
FIG. 1 is a pictorial view of a preferred embodiment of my invention showing a pair of metallic sheets in overlapped condition being fed to a pair of specially prepared rollers.

Referring now to FIG. 1 of the drawings in more detail, a pair of metallic sheets 10 and 12 are placed in overlapped relation and are guided by means of a guide roll 14 toward the nip of a pair of rollers 16 and 18, respectively. The sheets 10 and 12 may be of the same or different stiffness characteristics, if the latter, the upper sheet 10 should be stiffer than the lower sheet 12 for reasons which will appear more fully below. The rollers 16 and 18 rotate in opposite directions with respect to each other, the upper roller 16 rotating in a clockwise direction as viewed from its left end and the lower roller 18 rotating in a counter-clockwise direction. It will be understood that these rollers are rotatably supported in the conventional frame structure of a rolling mill and are driven by power sources of a known type (not shown).

The roller 16 is a cylindrical roller of conventional type having a smooth face; in contrast, the roller 18 has a groove 20 formed circumferentially around its surface and located in a position corresponding to the overlapped segment of the metallic sheets 10 and 12. The width of this segment is slightly larger than the width of the overlap between the two sheets, while the depth of this segment is approximately of the dimensions of the thickness of the sheet 12; the reason for this will be more readily apparent below.

FIG. 2 is a side sectional view of the rollers 16 and 18 of FIG. 1 showing the sheets 10 and 12 passing through them. As these sheets approach the plane of minimum separation between the rollers, (indicated by the line 5—5 of FIG. 2), the upper sheet 10 increasingly shears through the lower sheet 12 until a narrow segment 22 corresponding to the overlapped portion of the two sheets is sheared off from the lower sheet. This segment is forced into the groove 20 of the roller 18 and emerges from the rollers at the rear thereof as a strip 22. Simultaneously with the shearing action, the sheets 10 and 12 are increasingly forced into a single plane and are bonded along adjacent edge portions by means of the rollers 16 and 18 to form a single composite metallic sheet 24 which also emerges from the rear of the rollers 16 and 18.

Figure 4:
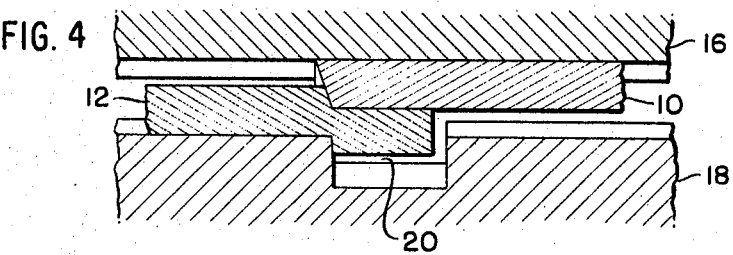
FIG. 4 is a transverse sectional view along the lines 4—4 of FIG. 2 showing the positioning of the sheets after contact with the rollers and after the shearing action has begun.

The steps in the edge-bonding of the two sheets may be seen more clearly in FIGS. 3 through 5 which are successive side sectional views through the adjacent portions of the rollers as shown in FIG. 2. As may be seen from FIG. 3, the upper sheet 10 preferably contains a beveled portion 26 along the left edge; the purpose of this is to increase the lateral pressure along the edges during the shearing and bonding operation in order to obtain a stronger bond of higher quality. This edge should, of course, be thoroughly cleaned before the bonding operation is begun in order that oxides and other surface films which would impede the formation of a good metallurgical bond may be removed. The lower edge of the beveled surface is positioned above the left wall 28 of the groove 20 which is formed in the lower roll 18, while the right hand portion of the sheet 12 is positioned to the left of the right wall 30 of the groove 20. The width of the overlap of the two sheets is thus somewhat less than the width of the groove 20. It may be found desirable, in some cases, to increase the bonding force which will be created by the shearing and rolling operation by positioning the lower beveled edge of the sheet 10 slightly to the left of the groove 20 in order to increase the side forces exerted on the sheets.

As the sheets 10 and 12 are advanced into the rollers 16 and 18, the upper sheet 10 increasingly shears into the lower sheets 12, thereby initiating the shearing off of the overlapping portion of the two sheets as may be seen more clearly in FIGURE 4. The portion being sheared is forced increasingly downwardly into the groove 20 whose side wall 28 assists in the shearing process by providing a bearing surface for the sheet 12.

FIGURE 5 shows the position of the two sheets at the end of the shearing process; at this point, the sheet 12 has been completely sheared through, the sheared segment 30 being deposited in the groove 20 in the lower roller 18. The sheet 10, due to the high lateral forces caused by the shearing and rolling operation, has been bonded along its edge to the edge of the sheet 12. It will be noted that a "clean" edge has been created on the sheet 12 by the shearing operation, this edge thus being free of the oxides and other contaminants which are formed on exposed surfaces. If the beveled surface 26 is appropriately prepared before the shearing and rolling operation to remove the contaminants and oxides that may have accumulated, a strong metallurgical bond will be formed between the sheets 10 and 12. The quality of the bond will depend on such factors as the types of metals which are being bonded, the prior preparation of the exposed edge of the sheet that is being bonded, and the forces generated during the rolling and shearing operation. To increase these forces, it may be found desirable to space the rollers to provide a reduction in thickness of the sheets of from 5 to 20%. If this is done, the depth of the groove 20 may be selected to be of approximately the same dimensions as the thickness of the sheets in order to provide a supporting surface for the upper sheet after it has sheared through the lower. Additionally, the upper sheet 10 may be positioned slightly to the left of the groove 20 to create an additional shearing force which will be transformed in part into an increased lateral bonding force. It may also be found desirable to restrain any possible side spread of the sheets either by positioning the guide roller 14 closely adjacent the rollers 16 and 18 or by providing additional shallow grooves in the latter rollers to accommodate the sheets during the shearing operation and restrain any tendency to spread laterally.

The sheet 24 which is formed as a result of the above process is a unique composite in the form of a single sheet having two formerly distinct portions integrally joined to each other along a common edge. Although sheets of the same type of material may be joined together in this fashion, my invention will be found most useful for joining together sheets of different types of material. Composites of the latter type may advantageously be used in many applications; for example, a superior contact element for electrical switches may be formed from a brass strip 1 inch wide and .012 inch thick bonded to a Cu-2% Be alloy of similar dimensions.

So far, a method of bonding two sheets of the same thickness has been described. In some cases, it may be desirable to bond sheets of different thicknesses as well as of different stiffness. FIGURES 6, 7 and 8 are sectional views of three alternative methods of accomplishing this, the sectional views shown in these figures corresponding to the sectional view shown in FIG. 5. In FIG. 6, an upper roller 32 has one portion 34 of reduced diameter, this portion effectively forming a "step" in the upper roller. A lower roller 36, corresponding to the roller 18 of FIGURE 5, has first and second portions 38 and 40 respectively of reduced diameter. First and second metallic sheets 42 and 44 are placed in overlapped relation and fed to the rollers 32 and 36 in the manner shown with respect to the sheets 10 and 12 in FIGURES 1 through 3. The sheet 44, which may have a bevel 46 on its left hand edge, is aligned with the reduced portions 34 and 38 of the rollers 32 and 36 respectively. Due to the bevel 46, the left edge of the reduced portion 34 is located to the left of the corresponding edge of the reduced portion or groove 40.

During the rolling operation, the sheet 44 increasingly shears through the sheet 42 until a segment 48 is sheared off completely and deposited in the groove 40, the edges of the sheets 42 and 44 simultaneously being bonded together. Due to the location of the reduced portions 34 and 38 and the reduced portion or groove 40, the sheet 42 is bonded to the sheet 44 at approximately the midpoint of the latter sheet. This positioning of the sheets may be shifted upwardly or downwardly with respect to one another by altering the location of the reduced portions as is described below with respect to FIGURES 7 and 8. Of course, due to the slightly different peripheral speeds of the two diameters of the roll, some slippage between the surfaces of the roll and the surfaces of the sheets will occur in these cases.

In FIGURE 7, an upper roll 50 of cylindrical shape has a fixed diameter at all portions, while a lower roll 52 has first and second reduced portions 54 and 56 respectively corresponding to the reduced portions 38 and 40 in the roller 36 of FIGURE 6. In FIGURE 8, an upper roller 58 has a portion 62 of reduced diameter, while a lower roller 60 has a reduced portion or groove 64 formed in it corresponding to the groove 20 of the roller 18 in FIGURE 5. The shearing and bonding processes in FIGURES 7 and 8 are similar to those in FIGURE 6, except that the thiner sheet is bonded to the thicker sheet adjacent the upper or lower surface respectively of the thicker sheet instead of at an intermediate portion as shown in FIGURE 6.

As so far described, I have shown how the method of edge-bonding in accordance with my invention may advantageously be practiced by using a pair of rollers, at least one of which is specially formed, to effectuate the combined shearing and bonding operation. It is not intended, however, that my invention be so limited and various alternative arrangements may be utilized to practice my invention.

Examples of such alternative arrangements are illustrated in FIGS. 9 through 11. FIG. 9, which is a transverse sectional view of an alternative embodiment of my invention, shows an upper roller 70 having a groove 72 formed in its surface and extending circumferentially around it. A lower roller 74 has a groove 76 extending circumferentially around its surface, the right wall 82 of the groove 72 being aligned with the left wall 84 of the groove 76. Sheets 78 and 80 which are to be edge-bonded to each other are fed to the rollers 70 and 74 in overlapped condition. As the sheets increasingly approach the plane of minimum separation between the rollers (corresponding to the plane 5 in FIG. 2), the rollers cause the sheets to increasingly shear into one another. For this purpose, the right wall 82 of the groove 72 acts as a bearing surface for the sheet 78, while the left wall 84 of the rollers 74 acts as a bearing surface for the sheet 80.

FIG. 10 shows the two sheets after they have completely sheared through each other. As may be seen from the drawing, segments 86 and 88 have been sheared off from the sheets 78 and 80 respectively and deposited in the grooves 72 and 76 respectively. The sheared portions of the sheets leave behind clean surfaces on the sheets 76 and 80 after they have been sheared off; this allows a strong edge-bond to be formed between the sheets without requiring extensive preparation of the edge of one of the sheets as was the case with the process illustrated in FIGS. 1 through 8. However, the process illustrated in FIGS. 9 and 10 does not allow the utilization of a beveled edge to increase the side forces during the shearing process and thus the process illustrated in FIGS. 1 through 8 may be preferred in most instances.

FIG. 11 is a transverse sectional view of still another embodiment of my invention in which the lower roll has been replaced by a specially prepared holder for holding the sheets to be edge-bonded. The holder 90 is in the form of a rectangular table having a recessed portion in which the two sheets 92 and 94 which are to be bonded are placed. A groove 96 extending longitudinally along the table is provided for receiving the sheared section 98 of the sheet 94. The side walls of the recessed section prevent the sheets 92 and 94 from spreading apart laterally when the sheets are subjected to a shearing force applied by a roller 100 which is moved over the sheets. As was the case with prior embodiments of my invention, the spacing between the roller 100 and the table 90 may be adjusted to provide a reduction in the thickness of the sheets if desired.

From the above it will be seen that I have provided a simple and efficient method of edge-bonding distinct metallic sheets to form a single sheet having the distinct sheets integral therewith. Further, I have provided useful apparatus for effectuating the method of my invention.

Having illustrated and described a preferred embodiment of my invention, what I claim as new and desire to secure by Letters Patent is:

1. A method of edge-bonding distinct metallic sheets to form a single sheet having said distinct sheets integral therewith, comprising the steps of overlapping the sheets along edge portions thereof, positioning said overlapped sheets against a supporting surface, and applying a force to said sheets in the vicinity of the overlapped segment of said sheets by means of a first cylindrical roller passing over said sheets and pressing said sheets against said surface to simultaneously shear through at least one of said sheets and thereby form a metallurgical bond between the adjacent edges of the sheets, at least one of said supporting surface and said roller having a groove formed in the surface thereof coextensive with said overlapped portions and of sufficient width and depth to receive the sheared portion of said sheets therein.

2. The method described in claim 1 in which said supporting surface comprises a second cylindrical roller.

3. The method described in claim 1 in which said supporting surface comprises a substantially planar surface positioned adjacent said first roller.

4. A method of edge-bonding distinct metallic sheets comprising the steps of overlapping said sheets along edge portions thereof and feeding said overlapped sheets through a pair of rollers, one of said rollers having a first circumferentially extending groove therein of a width at least equal to the width of said overlap, and positioned adjacent said overlap, the spacing between said rollers being substantially less than the combined thickness of said sheets whereby one of said sheets simultaneously shears through the overlapped portion and edge-bonds to the other of said sheets, the sheared portion being received in said groove, whereby a single sheet having said distinct sheets integral therewith may be formed.

5. The method described in claim 4 in which the other of said rollers has a circumferentially extending groove therein laterally displaced from said first groove and positioned adjacent said overlap whereby edge portions may be sheared from both said sheets to form clean edges during the shearing process, the sheared portions being received in the respective grooves.

6. The method described in claim 4 in which said one roller has a second circumferentially extending groove adjacent said first groove and of different depth than said groove for accommodating a metallic sheet of different thickness than the other of said sheets, whereby a single sheet having portions of different stiffness and different thickness integral therewith may be formed.

7. The method described in claim 6 in which the other of said rollers has a circumferentially extending groove therein opposite said first and second grooves and of a width at least equal to the width of one of said sheets for accommodating said sheet therein.

8. The method defined in claim 7 in which said rollers are spaced to reduce the thickness of either said metallic sheet by at least 5%.

9. The method described in claim 4 in which the other of said rollers has a circumferentially extending groove therein positioned opposite said first groove and having one side wall aligned therewith, said groove having a width at least equal to the width of one of said sheets for accommodating said sheet therein.

References Cited

UNITED STATES PATENTS

| | | | |
|---|---|---|---|
| 2,629,806 | 2/1953 | Anderson | 29—493 XR |
| 2,697,954 | 12/1954 | Sowter | 29—477.7 XR |
| 2,821,772 | 2/1958 | Belletter | 29—477 XR |
| 2,894,323 | 7/1959 | Sowter et al. | 29—481 |
| 3,197,855 | 8/1965 | Carter et al. | 29—497.5 XR |
| 3,330,026 | 7/1967 | Best et al. | 29—470.1 |

JOHN F. CAMPBELL, Primary Examiner

R. B. LAZARUS, Assistant Examiner

U.S. Cl. X.R.
29—482, 493, 497.5